(12) United States Patent
Takashima et al.

(10) Patent No.: US 6,276,472 B1
(45) Date of Patent: Aug. 21, 2001

(54) CONTROL SYSTEM FOR HYBRID VEHICLE

(75) Inventors: Hiroyuki Takashima, Aichi-gun; Shigehito Kimura, Okazaki; Tsutomu Hayashi, Anjo; Shoji Tzumi, Chiryu, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/259,264

(22) Filed: Mar. 1, 1999

(30) Foreign Application Priority Data

Apr. 1, 1998 (JP) .................................................. 10-088912
Apr. 14, 1998 (JP) .................................................. 10-102824

(51) Int. Cl.[7] .............................. B60K 6/04; F02N 17/00; F02B 77/08
(52) U.S. Cl. .................. 180/65.2; 180/65.3; 123/179.16; 123/198 DC
(58) Field of Search .................................. 180/65.3, 65.2, 180/65.8; 123/179.16, 179.17, 198 DB, 198 DC; 701/107

(56) References Cited

U.S. PATENT DOCUMENTS

| 5,146,882 | * | 9/1992 | Brinkman et al. | 123/179.5 |
| 5,204,816 | * | 4/1993 | Wright et al. | 123/479 |
| 5,561,332 | * | 10/1996 | Udo et al. | 123/198 DB |
| 5,725,064 | * | 3/1998 | Ibaraki et al. | 180/65.2 |
| 5,818,116 | * | 10/1998 | Nakae et al. | 123/339.1 |
| 5,826,671 | * | 10/1998 | Nakae et al. | 180/65.2 |
| 5,862,497 | * | 1/1999 | Yano et al. | 180/65.2 |
| 5,875,864 | * | 3/1999 | Yano et al. | 180/65.4 |
| 5,909,720 | * | 6/1999 | Yamaoka et al. | 123/179.3 |
| 6,058,912 | * | 5/2000 | Rembold et al. | 123/456 |

FOREIGN PATENT DOCUMENTS

A-6-165309  6/1994 (JP) .
A-9-56188  2/1997 (JP) .

* cited by examiner

Primary Examiner—Lanna Mai
Assistant Examiner—Jeffrey Restifo
(74) Attorney, Agent, or Firm—Nixon & Vanderhye P.C.

(57) ABSTRACT

In an electronic control for a hybrid vehicle which is driven either by an engine or an electric motor, or both, possible failures in an ignition system and a rotation sensor system are detected during a period in which the engine is rotated by the motor with no fuel supply. Only after no failure is found, the engine is started by supplying fuel and performing ignition. Thus, the fuel supplied to the engine is ignited without fail, and unburned gas release to the atmosphere is surely prevented. Also, good drivability is maintained. In case the invention is applied to a series hybrid vehicle which is driven solely by an electric motor powered by a battery which is charged by an electric generator driven by an engine, the ignition system is diagnosed when the engine is not rotating. After it is determined that there is no failure in the ignition system, the engine is started.

10 Claims, 8 Drawing Sheets

CONTROL SYSTEM FOR HYBRID VEHICLE

CROSS-REFERENCE TO RELATED APPLICATION

This application is based upon and claims benefit of priority of Japanese Patent Applications No. Hei-10-88912 filed on Apr. 1, 1998, and No. Hei-10-102824 filed on Apr. 14, 1998, the contents of which are incorporated herein by reference.

BACKGROUND OF THE INVENTION

1. Field of the Invention

The present invention relates to a hybrid vehicle having both an internal combustion engine and an electric motor for driving and, more particularly, to a technique for detecting both a failure in an ignition system (ignition system failure) of an internal combustion engine mounted on the hybrid vehicle and a failure in a rotation sensor system of the internal combustion engine.

2. Description of Related Art

Hitherto, a vehicle is driven by transmitting a rotation output generated by an internal combustion engine to wheels (driving wheels) and exhaust gases and noises occur upon driving. An electric vehicle driven by an electric motor has therefore been proposed. The electric vehicle, however, has a problem that a travel distance must be short because only an electric power preliminarily charged in a battery is used.

In recent years, a hybrid vehicle using both an internal combustion engine and an electric motor for driving has been used in practice used. In the hybrid vehicle, a generator is driven by an output of the internal combustion engine, power generated by the generator is charged into a battery, an electric motor is rotated by the electric power charged in the battery or the electric power from the generator, and the rotation output of the electric motor is transmitted to driving wheels.

Various types of the hybrid vehicles of this kind have been proposed such as a series type in which the internal combustion engine drives only the generator and the wheels are driven only by the electric motor and a parallel-series type which can apply a driving force to the wheels by both of the internal combustion engine and the electric motor. In the series hybrid vehicle (hereinbelow, referred to as an "SHV"), the internal combustion engine is mechanically separated from the driving system. When power generation is considered to be unnecessary in the cases such as a vehicle halt (the vehicle speed=zero) and during a driving in a state where the battery is sufficiently charged, the operation of the internal combustion engine is stopped. When a charge amount of the battery becomes lower than a predetermined amount in association with driving, the internal combustion engine is started by a separately provided starting motor or the like and is made operative and the battery is charged.

A parallel-series hybrid vehicle (hereinbelow, referred to as a "PSHV") has a power transmitting mechanism such as a magnet clutch and a planetary gear unit for transmitting both an output of the internal combustion engine and an output of the electric motor to the drive shaft for driving the wheels. Since the output of the internal combustion engine can be used not only for power generation but also for directly driving the wheels together with the output of the electric motor, energy transmission efficiency is high and the PSHV is considered to be especially promising.

In the PSHV, usually, the operation of both of the internal combustion engine and the electric motor is stopped when the vehicle comes to a halt. When the driver operates the accelerator pedal, only the electric motor is driven first to start the vehicle. In such a state, the internal combustion engine is in a "motoring state" where the fuel is not injected and the engine is rotated by the output of the electric motor. In the state where the fuel is not injected to the internal combustion engine, ignition to the engine is also stopped. After that, when the vehicle speed exceeds a predetermined value (for example, 20 km/h), the fuel injection and the ignition to the internal combustion engine are started and the internal combustion engine starts in a manner, i.e., the so-called "pushed start." After that, both the output of the internal combustion engine and that of the electric motor are controlled according to the driving load of the vehicle and the charging state of the battery. When the vehicle speed becomes below the predetermined value, the fuel injection and the ignition to the internal combustion engine are stopped, the internal combustion engine enters the "motoring state" again, and the vehicle is driven by using only the output of the electric motor.

In the internal combustion engine, an ignition system for igniting the fuel and a rotation sensor system are mounted. When a failure occurs in the ignition system, unburned gases are released from an exhaust pipe to the atmosphere in association with the fuel injection. When a failure occurs in the rotation sensor system, injection and ignition timing is deviated, so that unburned gases are released and the drivability of the vehicle deteriorates. Consequently, hitherto, in a control unit for controlling the internal combustion engine and the electric motor of the hybrid vehicle of this kind, in a manner similar to a common vehicle having only the internal combustion engine, whether or not the ignition system normally operates according to an ignition instruction signal generated from the control unit itself is monitored in the engine operating state where the fuel injection and the ignition to the internal combustion are performed. Whether a pulse signal is normally generated from the rotation sensor system or not is also checked. When a failure is detected by such failure diagnosis, the fuel injecting operation and the igniting operation are stopped to thereby stop the operation of the internal combustion engine.

The conventional control unit is, however, insufficient to achieve the inherent object of the hybrid vehicle, namely, suppression of environmental pollution. More specifically, in the conventional control unit, since failure diagnosis is performed to both the ignition system and the rotation sensor system when the internal combustion engine is in the operating state, deterioration in the exhaust gases (release of unburned gases) cannot be avoided for a period of time from the detection of a failure until the stopped of the fuel injection. Moreover, in the failure diagnosis of this kind, generally, occurrence of a failure is determined for the first time after a certain number of failures are detected in order to avoid erroneous detection. Consequently, due to the delay in the failure detection, unburned gases are released more.

Especially, in case of the PSHV, the output shaft of the internal combustion engine and that of the electric motor are mechanically connected via the power transmitting mechanism. The internal combustion engine is started in a "pushed start" manner by injecting fuel and igniting thereto at proper timing which matches the motoring speed. Upon starting the internal combustion engine in the PSHV, a larger amount of fuel is injected. Therefore, when the ignition system or the rotation sensor system is faulty, a larger amount of unburned gases is released, and the drivability is also adversely affected. Moreover, the emission of the unburned gases may cause an irreversible damage to a catalytic converter mounted on the vehicle for purifying the exhaust gases.

SUMMARY OF THE INVENTION

The present invention is made in view of the problems described above, and the object of the present invention is to certainly prevent both the release of unburned gases due to a failure in either the ignition system or the rotation sensor system of the internal combustion engine and deterioration of the drivability of the hybrid vehicle.

In a parallel-series hybrid vehicle (PSHV), the vehicle is driven by either an electric motor or an internal combustion engine, or both according to driving conditions of the vehicle. Usually, the vehicle is driven only by the motor when the vehicle is starting and driven at a low speed. When the vehicle is driven at a high speed or a high power is required, the vehicle is driven by both of the motor and the engine. An electric generator is also included in the driving system and is driven by the engine to charge a battery which in turn drives the motor. The driving system is electronically controlled by a control system mounted in the vehicle.

To initiate the engine operation in such a hybrid vehicle, the engine is first driven by the motor without supplying fuel to the engine and without performing ignition. In other words, the engine is started in a so-called "motoring state." According to the present invention, an ignition system for igniting fuel in the engine and a rotation sensor system for generating pulse signals in synchronism with rotation of the engine are diagnosed during the motoring state to detect possible failures in those systems. The ignition system is checked by sending a checking signal thereto. If a signal indicating a normal operation of the ignition system is generated, it is determined that there is no failure in the system, and if not it is determined that there is failure in the system. For the rotation sensor system, it is determined that there is no failure if predetermined pulse signals are generated in synchronism with the engine rotation.

If any failure is found either in the ignition system or in the rotation sensor system, or in both, during the motoring state, fuel supply to the engine is inhibited, thereby making the engine inoperative. In this occasion the hybrid vehicle may be driven only by the motor to drive back home using a limp-home function. Also, it is inhibited to resume fuel supply and ignition during the motoring state before the failure detection is completed. If no failure is found, fuel supply and ignition are performed to start a normal operation of the engine.

In the above-manner, unburned gases are surely prevented from being emitted into the atmosphere from the engine, and drivability of the hybrid vehicle is maintained in a good condition.

The present invention is applicable also to a hybrid vehicle which is driven solely by an electric motor that is powered by a battery charged from an electric generator driven by an internal combustion engine (a series hybrid vehicle). In this case, the ignition system is diagnosed when the engine is not rotating because there is no motoring state in the series hybrid vehicle. After it is determined that there is no failure in the ignition system under the diagnosis, the engine is put into operation by supplying fuel thereto. Therefore, it is assured that the ignition is normally performed, and release of unburned gases from the engine is prevented.

DETAILED DESCRIPTION OF THE PREFERRED EMBODIMENTS

First Embodiment

Figure 1:
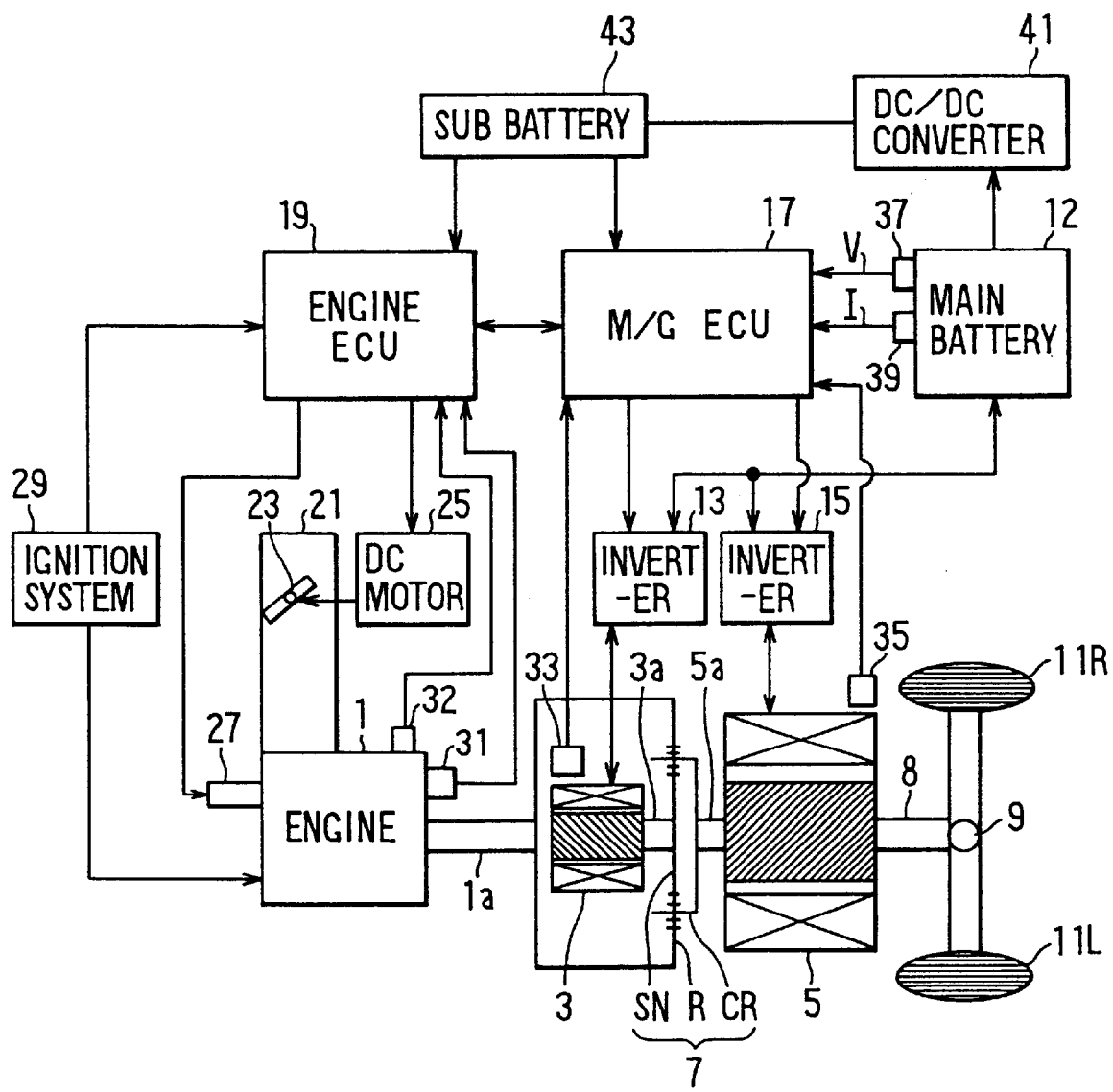
FIG. 1 is a block diagram showing a driving system of a hybrid vehicle.

A first embodiment of the present invention will be described hereinbelow with reference to FIGS. 1 to 7. FIG. 1 is a schematic block diagram of a hybrid vehicle to which the invention is applied. As shown in FIG. 1, the hybrid vehicle is a PSHV and comprises a four-cylinder internal combustion engine 1, two motor-generators (hereinbelow, referred to as M/Gs) 3 and 5 each operating as electric motor or generator, and a planetary gear unit 7 as a power transmitting mechanism.

The output shaft (crank shaft) 1a of the engine 1 is connected to a ring gear R of the planetary gear unit 7, the output shaft 3a extending from a rotor of the M/G 3 is connected to a sun gear SN of the planetary gear unit 7, and the output shaft 5a extending from a rotor of the M/G 5 is connected to a carrier CR of the planetary gear unit 7. The other end of the output shaft 5a opposite to that connected to the carrier CR is connected to a drive shaft 8 for driving wheels 11R and 11L in the vehicle. A driving force is transmitted from the drive shaft 8 to the wheels 11R and 11L via a differential gear 9.

Further, the hybrid vehicle of the embodiment comprises: a main battery 12 for charging electric power generated when each of the M/Gs 3 and 5 operates as a generator and for supplying the electric power when each of the M/Gs 3 and 5 operates as an electric motor; a motor-generator electronic control unit (hereinbelow, referred to as an M/G ECU) 17 for controlling both the M/Gs 3 and 5 via two inverters 13 and 15; and an engine electronic control unit (hereinbelow, referred to as an engine ECU) 19 for controlling the engine 1 while transmitting and receiving control information to/from the M/G ECU 17.

On the basis of an instruction from the M/G ECU 17, the inverter 13 converts a dc power of the main battery 12 to a three-phase ac power and makes the M/G 3 operate as an electric motor. On the basis of an instruction from the M/G ECU 17, the inverter 13 also makes the M/G 3 operate as a generator, converts the generated ac power to a dc power, and allows the dc power to be charged into the main battery 12. Similarly, on the basis of an instruction from the M/G ECU 17, the inverter 15 converts the dc power of the main battery 12 to the three-phase ac power and makes the M/G 5 operate as a generator. On the basis of an instruction from the M/G ECU 17, the inverter 15 also makes the M/G 5 operate as a generator, converts the ac power to the dc power, and allows the dc power to be charged into the battery 12. When one of the two M/Gs 3 and 5 operates as an electric motor and the other operates as a generator, the M/G operating as an electric motor can be driven by the power not only from the main battery 12 but also from the M/G operating as a generator.

On the other hand, a throttle valve 23 for regulating an intake air volume (further, an output of the engine 1) is provided in an intake path 21 of the engine 1. The opening angle of the throttle valve 23 (hereinbelow, referred to as a throttle opening angle) is regulated by a DC motor 25 serving as an actuator.

Around the engine 1, an injector (electromagnetic fuel injection valve) 27 for injecting fuel into each of the cylinders in accordance with a drive signal from the engine ECU 19 and an ignition system 29 for igniting the fuel for each cylinder in accordance with an ignition instruction signal from the engine ECU 19 are provided. Although the injectors 27 and the ignition system 29 are correspondingly provided to the respective cylinders of the engine 1, only one each is shown in FIG. 1.

Further, the system includes: a rotational angle sensor 31 for generating a pulse signal each time the output shaft 1a of the engine 1 rotates by a predetermined angle as a rotation sensor system for sensing a rotational angle of the output shaft 1a, that is, the rotational angle θC of the crank shaft of the engine 1 (hereinbelow, referred to as a crank rotational angle), piston positions, an actual rotational speed NEn of the engine 1, and the like; and a cylinder identifying sensor 32 for generating a pulse signal for cylinder identification each time the output shaft 1a is in a predetermined rotational angle position. The pulse signals from the rotational angle sensor 31 and the cylinder identifying sensor 32 are supplied to the engine ECU 19.

On the other hand, the M/Gs 3 and 5 have rotor position sensors 33 and 35, respectively. Each of the sensors senses a relative rotational angle of the rotor with respect to the stator (hereinbelow, called a rotor rotational angle θR) and the rotational speed of the rotor. Signals from the rotor position sensors 33 and 35 are supplied to the M/G ECU 17.

The hybrid vehicle system also includes a voltage sensor 37 for sensing an actual voltage V of the main battery 12 and a current sensor 39 for sensing an actual current I flowing in the main battery 12. The signals from the sensors 37 and 39 are also supplied to the M/G ECU 17. Further, although not shown, the M/G ECU 17 also receives signals from various sensors for sensing the driving conditions of the vehicle such as an accelerator sensor for sensing a stroke PA of an accelerator pedal (hereinbelow, referred to as an accelerator stroke) operated by a driver of the vehicle, a speed sensor for sensing a driving speed (namely, vehicle speed v) of the vehicle, and a brake sensor for sensing that the brake pedal of the vehicle is operated. In the embodiment, the dc voltage of the main battery 12 is decreased to a predetermined power supply voltage (for example, 12V) by a DC-DC converter 41 and is supplied to a sub battery 43. When an ignition switch 45 (refer to FIG. 2) is turned on, the M/G ECU 17 and the engine ECU 19 are operated by the power from the sub battery 43.

Figure 2:
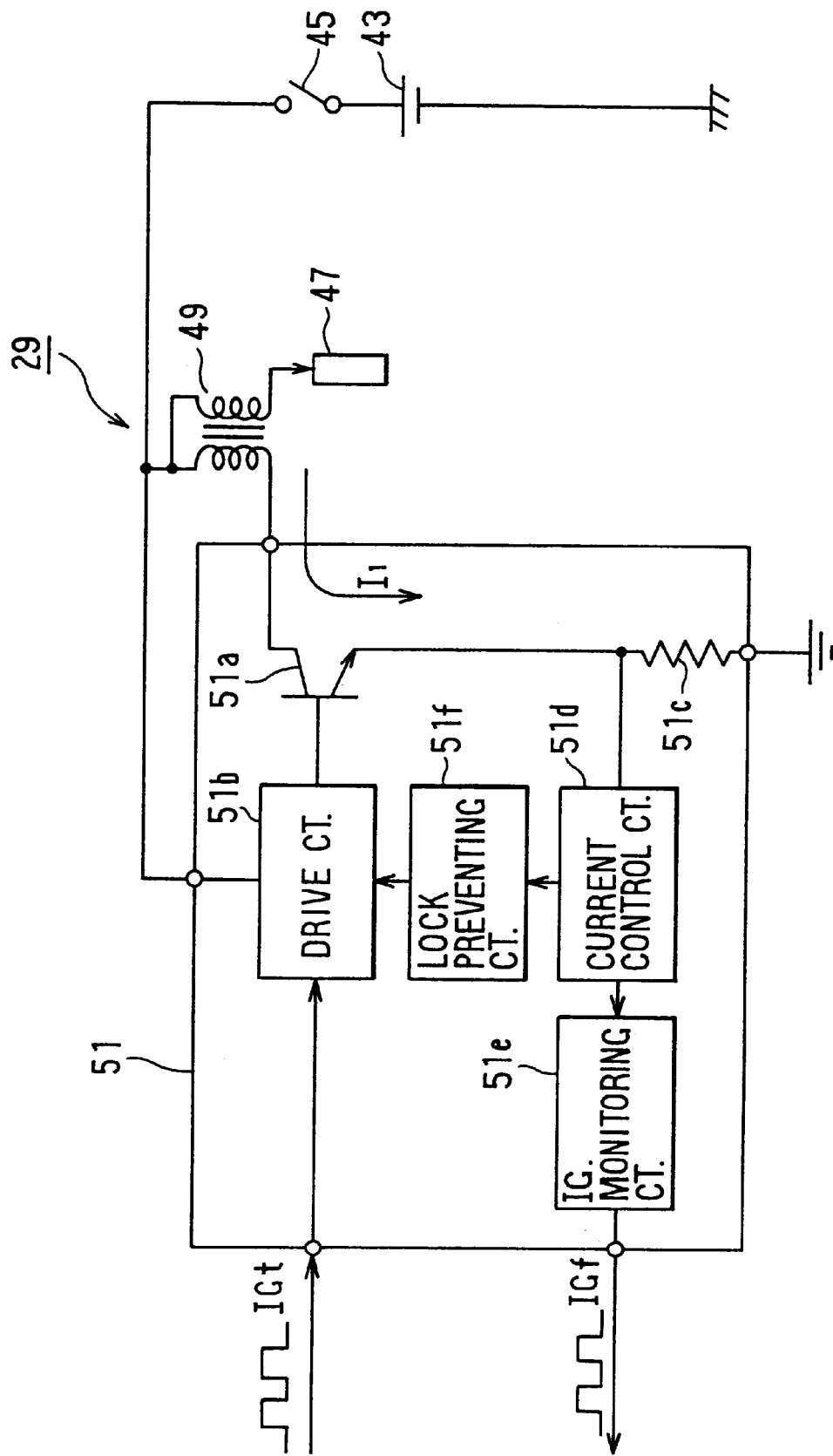
FIG. 2 is a block diagram showing an ignition system for an engine of the hybrid vehicle.

As shown in FIG. 2, the ignition system 29 comprises: a spark plug 47 for producing a spark in a cylinder of the engine 1; an ignition coil 49 for converting the power supplied from the sub battery 43 via the ignition switch 45 to a power for ignition of the spark plug 47; and an igniter 51 for allowing the ignition coil 49 to generate the power for ignition in response to an ignition instruction signal IGt from the engine ECU 19 and for sending back an ignition normal state signal IGf to the engine ECU 19 when it is regarded that the ignition using the spark plug 47 is normally performed.

The igniter 51 comprises: a transistor 51a for flowing a current (primary current) I1 to the primary coil of the ignition coil 49; a drive circuit 51b for turning on the transistor 51a in response to the ignition instruction signal IGt from the engine ECU 19; a resistor 51c for current detection provided in a current path of the primary current I1 of the ignition coil 49; a constant current control circuit 51d for detecting the primary current I1 flowing through the current detecting resistor 51c and controlling the primary current I1 to a constant value; an ignition monitoring circuit 51e for generating the ignition normal state signal IGf to the engine ECU 19 when the constant current control circuit 51d detects that the primary current I1 larger than a predetermined value flows; and a lock preventing circuit 51f for determining that the ignition instruction signal IGt remains to be generated for some reason when the constant current control circuit 51d detects that the primary current I1 keeps flowing for a specified time or longer, and for forcedly turning off the transistor 51a.

In the ignition system 29, the transistor 51a of the igniter 51 is turned on or off in accordance with the ignition instruction signal IGt from the engine ECU 19. When the transistor 51a is turned on, the primary current I1 flows in the ignition coil 49. Subsequently, when the transistor 51a is turned off, a high voltage is generated in the secondary coil of the ignition coil 49 and the high voltage is supplied to the spark plug 47. Then, a spark is produced by the spark plug 47 and the ignition for the cylinder is carried out. When the primary current I1 flows in the ignition coil 49 as mentioned above, the ignition normal state signal IGf is outputted from the ignition monitoring circuit 51e of the igniter 51 to the engine ECU 19.

On the contrary, for example, when the ignition coil 49 or the igniter 51 is failed or a wire is cut, the ignition normal state signal IGf is not outputted from the igniter 51 to the engine ECU 19. When the ignition instruction signal IGt is delivered but the ignition normal state signal IGf is not returned from the igniter 51, the engine ECU 19 can therefore determine that the ignition to the cylinder cannot be performed (that is, the ignition system 29 does not operate normally).

In such a hybrid vehicle system described above, the driving force is transmitted from the output shaft 5a of the M/G 5 using the main battery 12 as a power supply source to the wheels 11R and 11L via the drive shaft 8 and the differential gear 9. As mentioned above, since the output shaft 5a of the M/G 5 is connected to the output shafts 3a and 1a of the M/G 3 and the engine 1 via the planetary gear unit 7, the driving force to the wheels 11R and 11L or a deceleration force from the wheels 11R and 11L is shared among the M/Gs 3 and 5 and the engine 1. In other words, the output of the engine 1 and the outputs of the M/Gs 3 and 5 are added by the planetary gear unit 7 and are transmitted via the drive shaft 8 and the differential gear 9 to the wheels 11R and 11L.

On the basis of the charge state of the main battery 12, the gear ratio of the planetary gear unit 7, and the operating conditions of the vehicle (vehicle speed v, accelerator stroke PA, and the like) sensed by the vehicle sensor, the accelerator sensor, and the like, the M/G ECU 17 determines the rotational speed and output torque (an output torque when the M/G operates as an electric motor and a regenerative torque when the M/G operates as a generator) of each of the M/Gs 3 and 5 to control the three-phase alternate current supplied to the M/Gs 3 and 5 by the inverters 13 and 15. The M/G ECU 17 also determines the target outputs (that is, a target output torque TRQm and a target rotational speed NEm) of the engine 1 so that the fuel consumption and emission of the engine 1 become optimum. Further, the M/G ECU 17 controls the outputs of the M/Gs 3 and 5 so that the determined target torque TRQm is supplied as a load to the output shaft 1a of the engine 1.

The engine ECU 19 controls the fuel injection to the engine 1 and the ignition timing in accordance with the target outputs instructed by the M/G ECU 17, and controls the throttle opening angle by driving the DC motor 25 so that the actual rotational speed NEn of the engine 1 detected on the basis of a signal from the rotational angle sensor 31 becomes equal to the target rotational speed NEm instructed by the M/G ECU 17. Consequently, the output of the engine 1 is controlled to the target output determined by the M/G ECU 17.

Under such operations of the M/G ECU 17 and the engine ECU 19, the M/Gs 3 and 5 and the engine 1 are controlled as follows. Specifically, when the vehicle is stopped (vehicle speed v is zero), the M/G ECU 17 and the engine ECU 19 stop the operation of the engine 1 and the M/Gs 3 and 5. When it is sensed that the accelerator pedal is depressed, first, one or both of the M/Gs 3 and 5 is/are operated as an electric motor and the vehicle is started by the output of the electric motor. In such a state, the engine 1 enters the motoring state where the fuel is not injected and the engine 1 is rotated by the outputs of the M/Gs 3 and 5.

When the vehicle speed v exceeds a predetermined value (20 km/h, for example), the fuel injection and the ignition to the engine 1 are started and the engine 1 is started in the "pushed start" manner. After that, the engine 1 and the M/Gs 3 and 5 are controlled in various power balance patterns. For example, when the main battery 12 is charged with a predetermined amount of power or more and the driving load is small, the M/G 5 is operated as an electric motor, and the vehicle is driven by the output of the M/G 5. The M/G 3 is operated as a generator by using the output of the engine 1, and the main battery 12 is charged with the power of the M/G 3. When the driving load becomes large in such a state, the driving force which is insufficient only by the output of the M/G 5 is compensated with the output of the engine 1. On the other hand, when the predetermined amount or a larger amount of power in the main battery 12 is discharged and the charged power is decreased, the vehicle is driven by the output of the engine 1 via the M/G 5, and the main battery 12 is charged with the power of the M/G 3 by using the remaining output of the engine 1.

When the vehicle speed v becomes below 20 km/h, the fuel injection and the ignition to the engine 1 are stopped to bring the engine 1 into the motoring state, and the vehicle is driven only by the output of one or both of the M/Gs 3 and 5.

Figure 3:
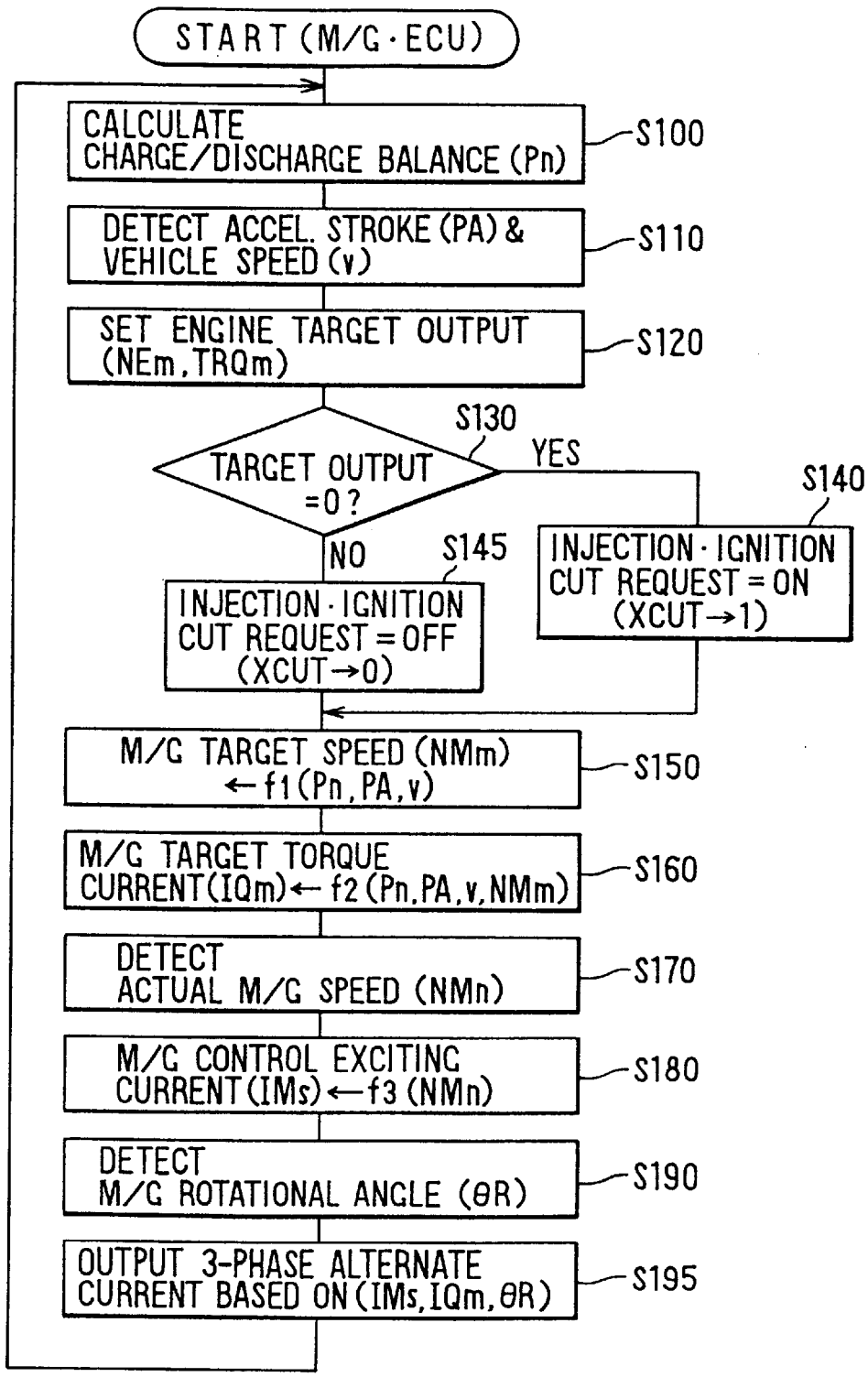
FIG. 3 is a flowchart showing a control process of a motor-generator used in the hybrid vehicle.

Processes executed by the M/G ECU 17 and the engine ECU 19 will now be described with reference to FIGS. 3 to 7. When the ignition switch 45 is turned on and the operation is started, the M/G ECU 17 repeatedly executes the processes of FIG. 3 in order to set the target output of the engine 1 (the target torque TRQM and the target rotational speed NEm) and to control both the M/Gs 3 and 5. FIG. 3 shows in detail the processes for controlling the M/G 3 and those for controlling the M/G 5 will be described hereinafter.

As shown in FIG. 3, when the M/G ECU 17 starts execution of the process, a balance Pn between charge and discharge of the main battery 12 is calculated in step (hereinbelow, simply described as "S") 100. The charge/discharge balance Pn is calculated by integrating the product of the voltage V and the current I of the main battery 12 detected on the basis of the signals from the voltage sensor 37 and the current sensor 39 with respect to time from the previous execution of the process to the execution of the present time.

In S110, the driving conditions of the vehicle such as the accelerator stroke PA and the vehicle speed v are detected on the basis of signals from the accelerator sensor, the vehicle speed sensor, and the like.

In S120, the target output of the engine 1 is set in accordance with the charge/discharge balance Pn (that is, the charging state of the main battery 12) calculated in S100 and the driving conditions of the vehicle such as the accelerator stroke PA and the vehicle speed v detected in S110, so that, for instance, the larger the accelerator stroke PA is or the smaller the charge amount of the main battery 12 is, the larger the output of the engine 1 becomes. Further, the target torque TRQm and the target rotational speed NEm of the engine 1 to achieve the set target output are set on the basis of an optimum fuel consumption and emission curve H shown in FIG. 4. The set target torque TRQm and target rotational speed NEm are transmitted to the engine ECU 19. The engine ECU 19 executes a process which will be described hereinafter, thereby controlling the engine 1 on the basis of the target torque TRQm and the target rotational speed NEm from the M/G ECU 17.

Figure 4:
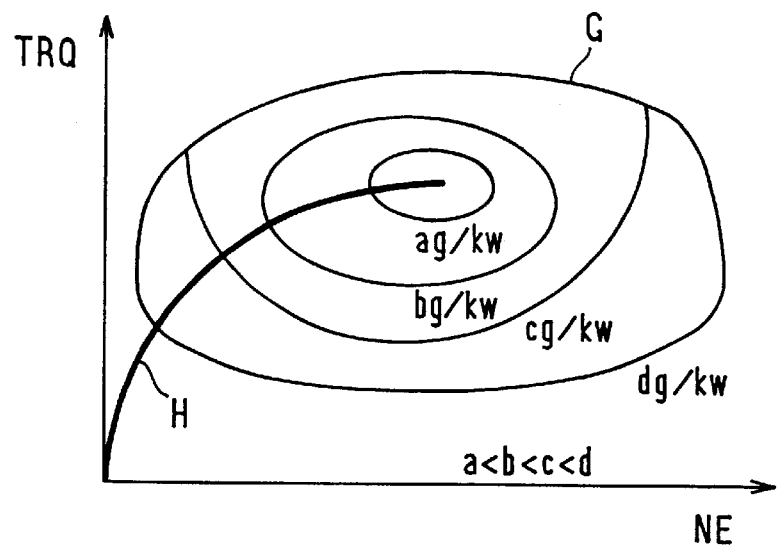
FIG. 4 is a graph showing a relation between engine speed and torque for obtaining optimum fuel consumption and exhaust emission.

The optimum fuel consumption and emission curve H illustrated in FIG. 4 shows the relation between the output torque (TRQ) and the rotational speed (NE) of the engine 1 for realizing the optimum fuel consumption and emission of the engine 1 and is stored as data in a ROM (not shown) in the M/G ECU 17. In S120, the output torque and the rotational speed on the optimum fuel consumption and emission curve H which can achieve the set target output are set as the target torque TRQm and the target rotational speed NEm. Curves G in FIG. 4 denote equivalent fuel consumption curves of the engine 1. The more the curve G is positioned in the center of FIG. 4, the fuel consumption is lower.

In S130, the M/G ECU 17 checks whether the target output set in S120 is "0" or not. When the target output is "0", an injection and ignition cut request XCUT for instructing that the fuel injection and the ignition to the engine 1 are stopped is set in the ON state (logical value 1) for instructing the stop and is transmitted to the engine ECU 19. On the contrary, if the target output set in S120 is not "0", the processing routine advances to S145 where the injection and ignition cut request XCUT is set in the OFF state (logical value 0) for not instructing the stop of the fuel injection and ignition, and the resultant data is transmitted to the engine ECU 19. To be specific, when the vehicle speed v is equal to or lower than 20 km/h, the fuel injection and the ignition to the engine 1 are not carried out as mentioned above, and the target output of the engine 1 is set at "0" in S120. In such a case, the injection and ignition cut request XCUT is set in the ON state and transmitted to the engine ECU 19.

After performing the process of S140 or S145, the M/G ECU 17 executes the following processes of S150 to S195, thereby calculating an exciting current determining the power efficiency and a torque current determining the output torque with respect to the M/G 3. Also, the M/G ECU 17 supplies a three-phase alternate current according to the exciting current and the torque current to an exciting coil of the M/G 3, thereby controlling the rotation of the M/G 3. More specifically, in S150, the target rotational speed NMm of the M/G 3 is calculated based on a formula "f1" preliminarily stored in the ROM, using the charge/discharge balance Pn calculated in S100 and the driving conditions of the vehicle such as the accelerator stroke PA and the vehicle speed v detected in S110. In S160, a target torque current IQm of the M/G 3 is calculated based on a function "f2" preliminarily stored in the ROM, using the charge/discharge balance Pn calculated in S100, the driving conditions of the vehicle such as the accelerator stroke PA and the vehicle speed v detected in S110 and the target rotational speed NMm calculated in S150. The formulae f1 and f2 are made on the basis of the gear ratio of the planetary gear unit 7, the power capacity of the main battery 12, and other relating factors.

In the following S170, on the basis of the signal from the rotor position sensor 33, the actual rotational speed NMn of the M/G 3 is detected. In S180, a control exciting current IMs used for controlling the M/G 3 is calculated based on a formula "f3" preliminarily stored in the ROM, using the rotational speed NMn of the M/G 3 detected in S170. In S190, on the basis of the signal from the rotor position sensor 33, the rotor rotational angle θR of the M/G 3 is detected. In S195, on the basis of the control exciting current IMs of the M/G 3 calculated in S180, the target torque current IQm of the M/G 3 calculated in S160, and the rotor rotational angle θR of the M/G 3 detected in S190, the three-phase alternate current to be supplied to the M/G 3 is calculated. An instruction is given to the inverter 13 so that the three-phase alternate current is supplied to the M/G 3. After that, the processing routine returns to the process of S100.

Although not shown, in order to control the M/G 5, the M/G ECU 17 also executes processes similar to those of S150 to S195 in FIG. 3 with respect to the M/G 5. More specifically, the target rotational speed NMm of the M/G 5 is calculated based on a formula "f1'" preliminarily stored in the ROM, using the charge/discharge balance Pn calculated in S100 and the driving conditions of the vehicle such as the accelerator stroke PA and the vehicle speed v detected in S110. Further, the target torque current IQm of the M/G 5 is calculated based on a formula "f2'" preliminarily stored in the ROM, using the charge/discharge balance Pn calculated in S100, the driving conditions of the vehicle such as the accelerator stroke PA and the vehicle speed v detected in S110, and the calculated target rotational speed NMm of the M/G 5. Subsequently, the actual rotational speed NMn of the M/G 5 is detected on the basis of the signal from the rotor position sensor 35. The exciting current IMs for controlling the M/G 5 is calculated based on a formula "f3'" preliminarily stored in the ROM, using the detected rotational speed NMn of the M/G 5. On the basis of the signal from the rotor position sensor 35, the rotor rotational angle θR of the M/G 5 is detected. On the basis of the detected rotor rotational angle θR, the calculated control exciting current IMs of the M/G 5, and the target torque current IQm, the three-phase alternate current to be supplied to the M/G 5 is calculated. An instruction is given to the inverter 15 so that the three-phase alternate current is supplied to the M/G 5.

Figure 5:
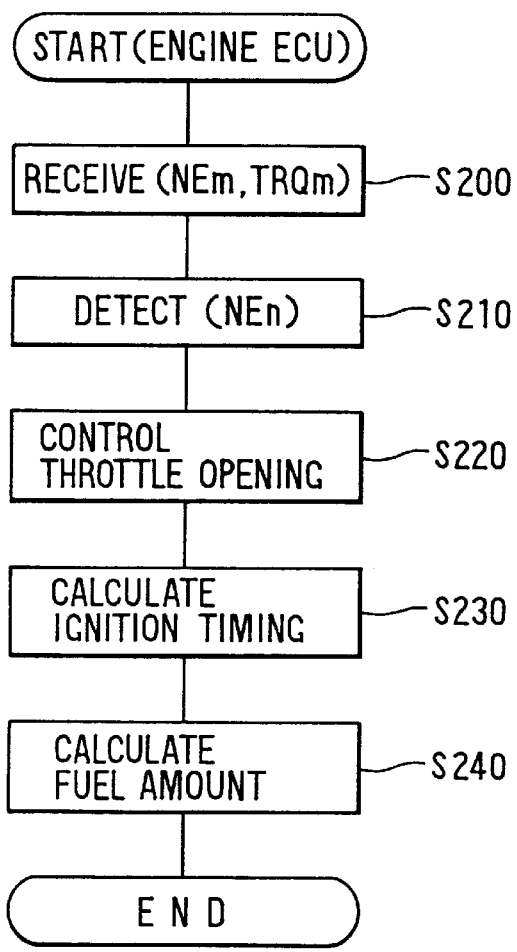
FIG. 5 is a flowchart showing a control process for setting an engine output at a target level.

On the other hand, after the ignition switch 45 is turned on, the engine ECU 19 repeatedly executes the process of FIG. 5 every predetermined time so as to control the output of the engine 1 to be equal to the target output determined by the M/G ECU 17. To be more specific, in S200, the target rotational speed NEm and the target torque TRQm which are transmitted from the M/G ECU 17 are received. In S210, the actual rotational speed NEn of the engine 1 is detected on the basis of the signal from the rotational angle sensor 31. In S220, the DC motor 25 is driven to control the throttle opening angle so that the actual rotational speed NEn of the engine 1 detected in S210 becomes equal to the target rotational speed NEm received in S200. Further, in S230 and S240, on the basis of the target torque TRQm received in S200, the present throttle opening angle controlled in S220 (that is, the intake air volume of the engine 1), the actual rotational speed NEn of the engine 1, the ignition timing and the fuel injection amount of the engine 1 are calculated, respectively. After that, the process is once finished. When new target rotational speed NEm and target torque TRQm are not transmitted from the M/G ECU 17 at the time of execution of S200, the routine immediately advances to S210. Then, the processes of S220 to S240 are executed by using the latest target rotational speed NEm and target torque TRQm which are received at the previous time.

Figure 6A:
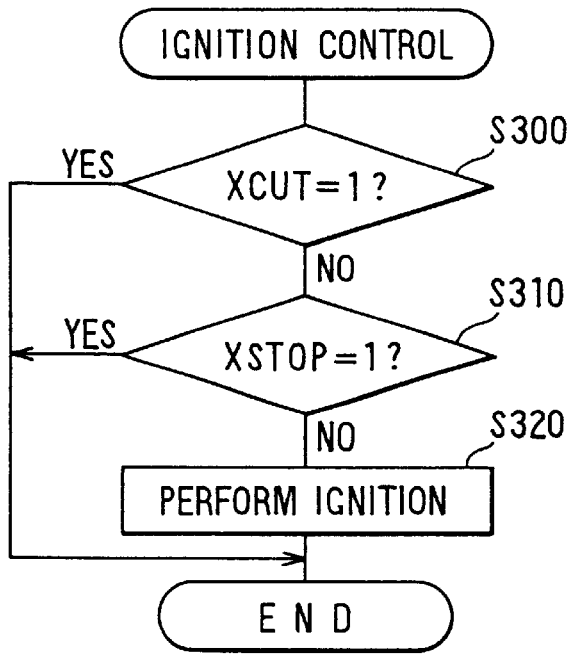
FIG. 6A is a flowchart showing a control process of the ignition system.
Figure 6B:
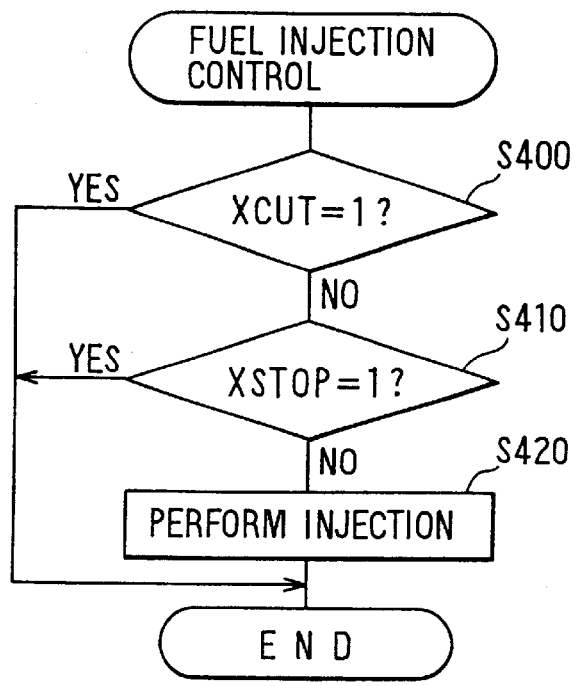
FIG. 6B is a flowchart showing a control process of a fuel injection system.

Each time the crank rotational angle θC detected on the basis of the signal from the rotational angle sensor 31 becomes the predetermined angle, the engine ECU 19 executes ignition controlling process of FIG. 6A and an injection controlling process of FIG. 6B. The ignition and the fuel injection to the engine 1 are carried out on the basis of the ignition timing and the fuel injection amount calculated in S230 and S240 of FIG. 5. More specifically, as shown in FIG. 6A, when the execution of the ignition controlling process is started, the engine ECU 19 checks in S300 whether the injection and ignition cut request XCUT transmitted from the M/G ECU 17 as mentioned above is in the ON state (logical value 1) or not. If the injection and ignition cut request XCUT is not in the ON state, whether an operation inhibition flag XSTOP indicating inhibition of the fuel injection and ignition to the engine 1 is in the ON state (logical value 1 indicative of inhibition) is checked in S310. When the operation inhibition flag XSTOP is not in the ON state, in S320, the ignition instruction signal IGt is outputted to the igniter 51 of the ignition system 29 at the ignition timing calculated in S230 in FIG. 5 to perform the ignition to the engine 1. After that, the ignition controlling process is finished.

On the contrary, when it is determined in S300 that the injection and ignition cut request XCUT is in the ON state (YES in S300) or when it is determined in S310 that the operation inhibition flag XSTOP is in the ON state (YES in S310), the ignition controlling process is immediately finished without performing the ignition to the engine 1.

As shown in FIG. 6B, when the execution of the injection controlling process is started, in S400, a check is made to see whether or not the injection and ignition cut request XCUT from the M/G ECU 17 is in the ON state (logical value 1). When the injection and ignition cut request XCUT is not in the ON state, in S410, whether the operation inhibition flag XSTOP is in the ON state (logical value 1) or not is checked. If the operation inhibition flag XSTOP is not in the ON state, in S420, a drive signal is outputted to the injector 27 for a period of time corresponding to the fuel injection amount calculated in S240 in FIG. 5 and the fuel is injected to the engine 1. After that, the injection controlling process is finished. On the contrary, when it is determined that the injection and ignition cut request XCUT is in the ON state in S400 (YES in S400) or when it is determined that the operation inhibition flag XSTOP is in the ON state in S410 (YES in S410), the injection controlling process is immediately finished without injecting the fuel to the engine 1.

Figure 7:
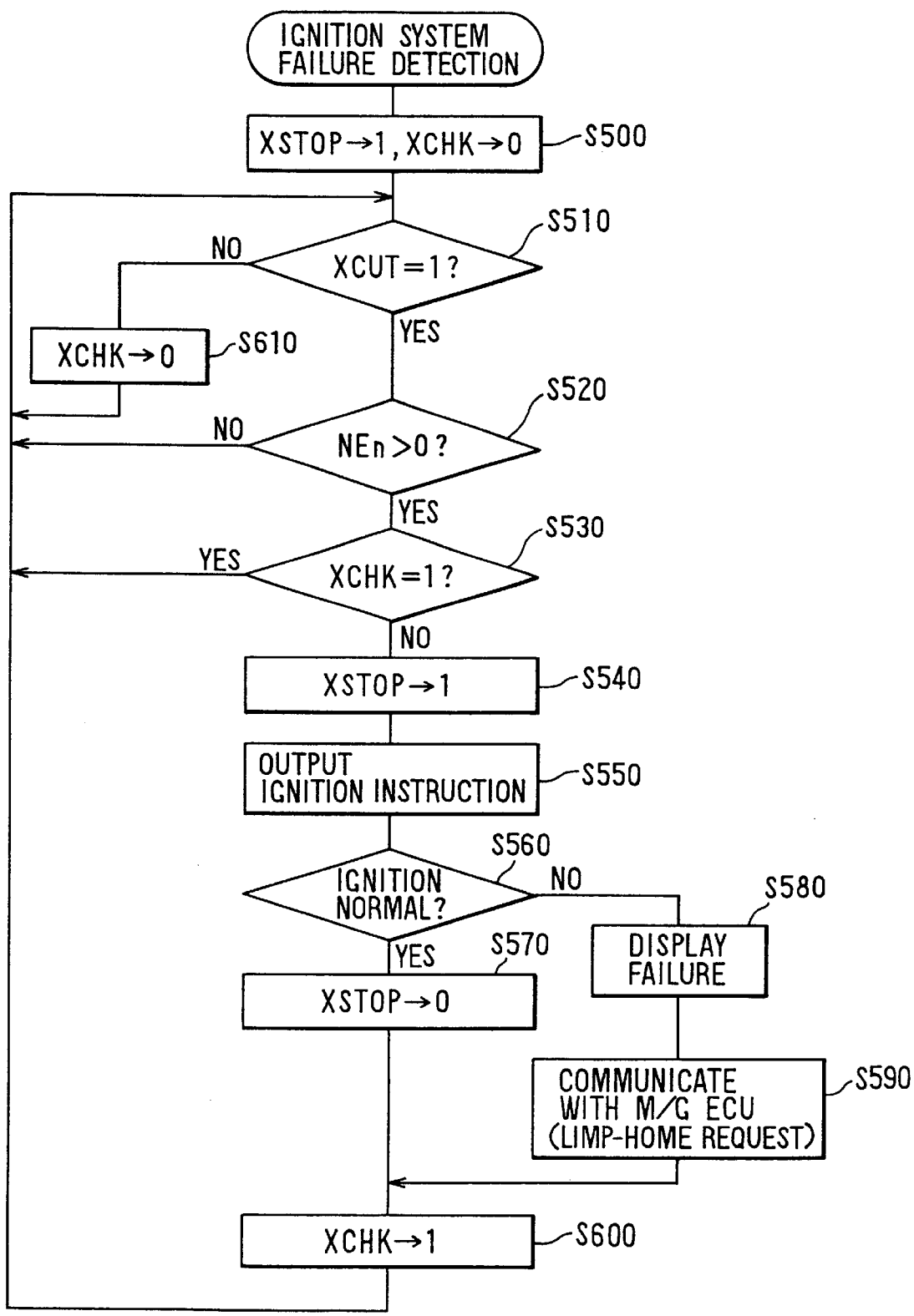
FIG. 7 is a flowchart showing a process for detecting a failure in the ignition system.

The engine ECU 19 executes an ignition system failure detecting process shown in FIG. 7 to detect the failure and to perform a fail-safe operation when the failure is detected. To be more specific, as shown in FIG. 7, when the ignition switch 45 is turned on and the operation is started, in S500, the engine ECU 19 initializes the operation inhibition flag XSTOP, which is referred to in S310 of the ignition controlling process and in S410 of the injection control process, to the ON state (logical value 1), thereby inhibiting the execution of the fuel injection and ignition to the engine 1. The engine ECU 19 also initializes a failure diagnosis completion flag XCHK indicating whether the failure diagnosis of the ignition system 29 has been completed or not to the OFF state (logical value 0) indicative of incompletion.

In S510, whether or not the injection and ignition cut request XCUT from the M/G ECU 17 is in the ON state is checked. If the injection and ignition cut request XCUT is in the ON state, it is determined that the engine is in the state where the fuel injection and ignition to the engine 1 are not carried out by the ignition controlling process of FIG. 6A and the injection controlling process of FIG. 6B, and the processing routine advances to S520. In S520, whether the engine 1 is rotating or not (that is, whether the actual rotational speed NEn of the engine 1 is larger than "0" or not) is checked. Whether the engine 1 is rotating or not can be checked on the basis of either a signal from the rotational angle sensor 31 or information indicating whether the engine 1 is rotating or not provided by the M/G ECU 17 since the M/G ECU 17 can determine whether the engine 1 is rotating or not from the rotating state of the M/Gs 3 and 5 which are controlled by itself.

When the rotation of the engine 1 is detected in S520, it is determined that the engine 1 is in the motoring state where the fuel injection and the ignition to the engine 1 are not executed and the engine 1 is rotated by the outputs of the M/Gs 3 and 5. Then the processing routine advances to S530 and whether the failure diagnosis completion flag XCHK is in the ON state (logical value 1) or not is checked. If the failure diagnosis completion flag XCHK is not in the ON state (in the OFF state), it is determined that the failure diagnosis of the ignition system 29 has not been completed yet. The routine progresses to S540 where the operation inhibition flag XSTOP is set in the ON state. After that, in S550, the ignition instruction signal IGt is outputted once each time to the igniter 51 in the ignition system 29 of each cylinder. In a manner similar to S320 of the ignition controlling process, in S550, the ignition instruction signal IGt is outputted sequentially at timings synchronized with the crank rotational angle θC of the engine 1 in each cylinder.

Further, in S560, in response to the ignition instruction signal IGt generated in S550, by checking whether or not the ignition normal state signal IGf is returned from the igniter 51 of each cylinder, whether the ignition system 29 normally operates in response to the ignition instruction signal IGt or not is determined. When it is determined that the ignition system 29 is normal, the routine advances to the next S570. In S570, the operation inhibition flag XSTOP is set into the OFF state (logical value 0) to permit the fuel injection and the ignition to the engine 1 by the execution of the ignition controlling process and the injection controlling process.

On the contrary, when it is determined in S560 that the ignition system 29 is not normal (that is, when the ignition normal state signal IGf is not returned from the igniter 51), the routine advances to S580 where a failure displaying process such as turn-on of a malfunction warning lamp arranged in a meter panel in the vehicle or display of a message notifying of a failure of the engine 1 on a display in the vehicle is performed. In S590, a limp-home request is transmitted to the M/G ECU 17. The limp-home request is a request for shifting the operation mode of the M/G ECU 17 to the control mode (limp-home mode) at the time of fail-safe operation for driving the vehicle only by the outputs of the M/Gs 3 and 5. After transmitting the limp-home request to the M/G ECU 17 in S590 or after setting the operation inhibition flag XSTOP into the OFF state in S570, the routine advances to S600 where the failure diagnosis completion flag XCHK is set into the ON state. After that, the routine is returned to S510.

When it is determined in S510 that the injection and ignition cut request XCUT from the M/G ECU 17 is not in the ON state (NO in S510), the routine advances to S610 where the failure diagnosis completion flag XCHK is set into the OFF state. After that, the routine is returned again to S510. On the other hand, when it is determined in S520 that the engine 1 is not rotating or when it is determined in S530 that the failure diagnosis completion flag XCHK is in the ON state, the routine is immediately returned to S510.

By such ignition system failure detecting process of FIG. 7, in the hybrid vehicle in this embodiment, the failure diagnosis to the ignition system 29 of the engine 1 is carried out as follows. When the vehicle speed v is equal to or lower than 20 km/h, the injection and ignition cut request XCUT from the M/G ECU 17 to the engine ECU 19 enters the ON state. Consequently, just after the start of execution of the ignition system failure detecting process of FIG. 7 by the turn-on of the ignition switch 45, it is positively determined in S510 that the injection and ignition cut request XCUT is in the ON state (that is, the engine is in the state where the fuel injection and ignition to the engine 1 are not performed by the ignition controlling process of FIG. 6A and the injection controlling process of FIG. 6B) (YES in S510).

When the accelerator pedal is pressed down by a driver to start the vehicle by at least one of the outputs of the M/Gs 3 and 5 controlled as electric motors, and the engine 1 enters the motoring state, it is positively determined in S520 that the engine 1 is rotating (YES in S520). The determination in S530 is negative (NO) at this point because the flag XCHK is previously set to zero (0) in S500. In S540, the operation inhibition flag XSTOP is set in the ON state, thereby inhibiting the execution of the fuel injection (S420) and the ignition (S320) to the engine 1 by the ignition controlling process of FIG. 6A and the injection controlling process of FIG. 6B even if the injection and ignition cut request XCUT from the M/G ECU 17 to the engine ECU 19 is changed into the OFF state.

Subsequently, by the processes of S550 and S560, the failure diagnosis to the ignition system 29 is made. More specifically, the ignition instruction signal IGt is outputted once each time to the igniter 51 of the ignition system 29 of each cylinder (S550). When the ignition normal state signal IGf is returned from the igniter 51 of each cylinder in response to the ignition instruction signal IGt, it is determined that the ignition system 29 is normal (YES in S560). When the ignition system 29 is determined as normal as mentioned above, the operation inhibition flag XSTOP is set into the OFF state (S570), thereby permitting the fuel injection and the ignition to the engine 1 by the ignition controlling process of FIG. 6A and the injection controlling process of FIG. 6B when the injection and ignition cut request XCUT from the M/G ECU 17 to the engine ECU 19 enters the OFF state.

If the ignition normal state signal IGf is not returned from the igniter 51 of each cylinder in response to the ignition instruction signal IGt generated in S550, it is determined that the ignition system 29 has a failure (NO in S560). The failure is displayed (S580) and the limp-home request is transmitted to the M/G ECU 17 (S590). When a failure is detected as mentioned above, the operation inhibition flag XSTOP remains in the ON state. Consequently, even if the injection and ignition cut request XCUT from the M/G ECU 17 to the engine ECU 19 enters the OFF state, the fuel injection and the ignition to the engine 1 by the ignition controlling process of FIG. 6A and the injection controlling process of FIG. 6B are inhibited.

When the failure diagnosis to the ignition system 29 is completed in the above manner, the failure diagnosis completion flag XCHK is set into the ON state in S600. Consequently, even if both S510 and S520 are positively determined, S530 is positively determined (that is, it is determined that the failure diagnosis has been completed), and the failure diagnosis to the ignition system 29 is not performed.

On the other hand, when the vehicle speed v exceeds 20km/h after that and the injection and ignition cut request XCUT from the M/G ECU 17 to the engine ECU 19 is changed from the ON state to the OFF state, S510 becomes negative (NO in S510) and the failure diagnosis completion flag XCHK is set into the OFF state in S610. Consequently, when the injection and ignition cut request XCUT is changed from the ON state to the OFF state, the processes of S510 and S610 are executed again. If the ignition system 29 is determined as normal by the previous failure diagnosis (S560: YES), the fuel injection and the ignition to the engine 1 are performed by the ignition controlling process of FIG. 6A and the injection controlling process of FIG. 6B.

After that, when the vehicle speed v becomes equal to or lower than 20 km/h and the injection and ignition cut request XCUT from the M/G ECU 17 to the engine ECU 19 is changed from the OFF state to the ON state, S510 and S520 are positively determined again, and S530 is negatively determined. Consequently, the failure diagnosis for the ignition system 29 is performed by the processes of S540 and subsequent steps. That is, in the ignition system failure detecting process of FIG. 7, each time the engine 1 enters the motoring state (more specifically, when the engine 1 enters in the motoring state for the first time by the turn-on of the ignition switch 45 and each time the engine operating state where the fuel injection and the ignition are performed is changed to the motoring state), the failure diagnosis for the ignition system 29 is carried out once.

As described above in detail, in the M/G ECU 17 and the engine ECU 19, when the engine is in the state where the fuel injection to the engine 1 is not performed (YES in S510), the ignition instruction signal IGt is outputted to the ignition system 29 (S550) and whether the ignition system 29 operates normally or not is checked in response to the ignition instruction signal IGt (S560). When it is detected that the ignition system 29 has a failure, the execution of the fuel injection to the engine 1 is inhibited. By the ECUs 17 and 19 of the embodiment, therefore, the condition of the ignition system 29 can be checked before the fuel injection is started to activate the engine 1 in the hybrid vehicle. As a result, fuel injection to the engine 1 can be prevented when the ignition system 29 has a failure. Unburned gasses from the engine 1 generated due to the failure in the ignition system 29 (ignition system failure) can be therefore certainly prevented from being released, and the effect on suppressing the environment pollution, produced by the hybrid vehicle, can be improved.

Especially, in case of the PSHV as in the embodiment, the engine 1 is started in the "pushed start" manner by execution of the fuel injection and the ignition in the motoring state using the outputs of the M/Gs 3 and 5. If the ignition system 29 has a failure upon starting, much more unburned gases are released and the drivability also deteriorates. By the ECUs 17 and 19 of the embodiment, the release of the unburned gases and the deterioration in drivability due to the failure in the ignition system 29 can be certainly prevented.

According to the embodiment, the ignition instruction signal IGt for failure diagnosis is outputted to the ignition system 29 when the engine 1 is in the motoring state (YES in S510 and S520). Consequently, in a manner similar to S320 in FIG. 6A for outputting the ignition instruction signal IGt in the normal operating mode, the ignition instruction signal IGt for failure diagnosis can be outputted at timings synchronized with the crank rotational angle θC of the engine 1, so that the embodiment is advantageous. That is, as a process for outputting the ignition instruction signal IGt for failure diagnosis, a process similar to that of S320 in FIG. 6A can be used and it is unnecessary to execute a special process. Both of the processes can be combined into a single process.

Further, according to the embodiment, in the ignition system failure detecting process of FIG. 7, when the operation inhibition flag XSTOP is set in the ON state in S540 just before S550 where the ignition instruction signal IGt for failure diagnosis is outputted and it is determined in S560 that the ignition system 29 is normal (YES in S560), the operation inhibition flag XSTOP is again set in the OFF state (S570). If not (NO in S560), the operation inhibition flag XSTOP is left in the ON state. That is, the execution of the fuel injection to the engine 1 by the injection controlling process in FIG. 6B is inhibited just before outputting the ignition instruction signal IGt for failure diagnosis to the ignition system 29. When it is determined that the ignition system 29 is normal, the execution of the fuel injection by the injection controlling process is permitted.

Even if the injection and ignition cut request XCUT from the M/G ECU 17 to the engine ECU 19 is changed from the ON state to the OFF state in a period since the ignition instruction signal IGt for failure diagnosis is outputted until the failure or normal state of the ignition system 29 is determined, the fuel is not injected to the engine 1. As a result, even a remote possibility that the fuel is injected to the engine 1 in spite of occurrence of a failure in the ignition system 29 can be eliminated.

Although the first embodiment of the present invention has been described above, it will be obviously understood that the invention may be modified in various ways. The following (1) to (4) are examples of possible modifications.

(1) In the foregoing embodiment, in the engine un-operated state where the fuel injection is not executed to the engine 1 and in the motoring state where the engine 1 is rotating, the failure diagnosis is carried out by transmitting the ignition instruction signal IGt to the ignition system 29 (igniter 51). It is also possible to eliminate S520 in FIG. 7 and to perform the failure diagnosis of the ignition system 29 in the rotating state of the engine 1. In this case, a process for outputting the ignition instruction signal IGt asynchronously with the rotation of the engine 1 is provided.

(2) Although the invention is applied to the PSHV in which the output of the engine 1 is used also for driving the wheels 11R and 11L in the foregoing embodiment, the invention can be also applied to the SHV, in which the M/G 5 is separated from the M/G 3 and the engine 1 and the engine 1 generates the power only to drive the M/G 3. In case of such an SHV, in which the engine 1 does not enter the motoring state, the process corresponding to that of S520 in FIG. 7 is omitted as in the system mentioned in (1) above, and the ignition instruction signal IGt is sent to the ignition system 29 to perform the failure diagnosis to the ignition system 29 when the engine is not operating.

(3) On the other hand, according to the foregoing embodiment, the ignition instruction signal IGt is outputted once each time to the ignition system 29 of each cylinder in S550 in FIG. 7. It is also possible to output the ignition instruction signals IGt a plurality of times to each cylinder. For example, the following manner can be considered. When the ignition instruction signal IGt is outputted twice for each cylinder and a failure is detected only at the first time, the check is made again in the next failure diagnosis. When the failure is detected twice, it is regarded that a failure really occurs and the fail-safe process in S580 and S590 in FIG. 7 is executed.

(4) Although the ignition system 29 in FIG. 2 is provided for each cylinder in the engine 1 in the foregoing embodiment, the invention can be also similarly applied to an ignition system having only a single igniter 51 and ignition coil 49, in which the high voltage for ignition is distributed from the ignition coil 49 to the spark plug 47 of each cylinder via a distributer.

Second Embodiment

A second embodiment of the invention will be described hereinbelow with reference to FIGS. 8 and 9. The first embodiment is to detect a failure in the ignition system. In the second embodiment, a failure in a rotation sensor system is detected. When a failure occurs in the rotation sensor system, that is, the rotational angle sensor 31 and the cylinder identifying sensor 32, the ignition controlling process and the injection controlling process shown in FIGS. 6A and 6B cannot be executed at proper timing. As a result, the fuel injection timing and the ignition timing to the engine 1 are deviated, so that unburned gases are released from the exhaust pipe of the engine 1 and the drivability of the vehicle deteriorates.

Figure 8:
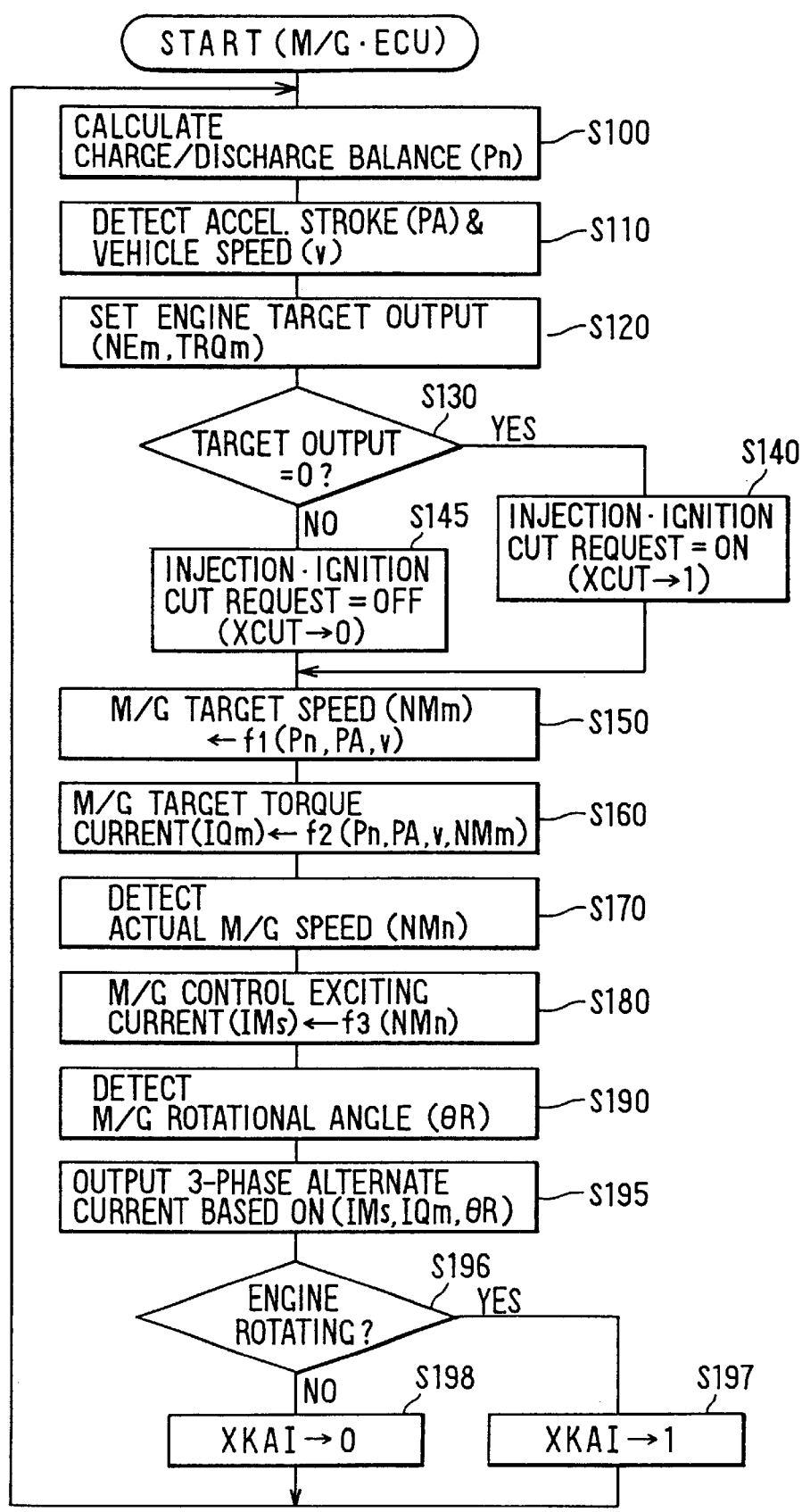
FIG. 8 is a flowchart showing another control process of the motor-generator used in the hybrid vehicle.

With reference to FIG. 8, the control of the M/Gs 3 and 5 in the present embodiment will be described first. The process up to and including S195 is the same as that of the first embodiment shown in FIG. 3. In the present embodiment, S196, S197, and S198 are added to the process. The M/G ECU 17 instructs the inverters 13 and 15 to control the rotation of the M/Gs 3 and 5 through the process of S150 to S195. After that, whether the engine 1 is rotating or not is checked on the basis of the rotational speeds of the M/Gs 3 and 5 which are determined in S196 by the signals from the rotor position sensors 33 and 35. If the engine 1 is rotating, in S197, engine rotating state data XKAI for notifying whether the engine 1 is rotating is set in the ON state (logical value 1) indicating that the engine 1 is rotating, and the resultant data is transmitted to the engine ECU 19. On the contrary, when it is determined in S196 that the engine 1 is not rotating, the processing routine advances to S198 where the engine rotating state data XKAI is set in the OFF state (logical value 0) indicating that the engine 1 is not rotating, and the resultant data is transmitted to the engine ECU 19.

To be specific, since the output shafts 1a, 3a, and 5a of the engine 1 and the M/Gs 3 and 5 are connected to each other via the planetary gear unit 7, the M/G ECU 17 detects the rotational speed of the engine 1 by the rotating states of the M/Gs 3 and 5. The M/G ECU 17 therefore notifies the engine ECU 19 of the rotation state of the engine 1 by means of the engine rotating state data XKAI. After performing the process of S197 or S198, the routine goes back to the above-mentioned process of S100.

Also in the second embodiment, the ignition controlling process shown in FIG. 6A and the injection controlling process shown in FIG. 6B are executed in a manner similar to the first embodiment. The rotation sensor system failure detecting process is carried out according to the flowchart of FIG. 9. Specifically, when the ignition switch is turned on and the operation is started, in S600, the engine ECU 19 initializes the operation inhibition flag XSTOP into the ON state (logical value 1), which is referred to in S310 of the ignition controlling process and in S410 of the injection controlling process, thereby inhibiting the execution of the fuel injection and the ignition to the engine 1. The engine ECU 19 also initializes the failure diagnosis completion flag XCHK for indicating whether the failure diagnosis for the rotation sensor system has been completed or not into the OFF state (logical value 0) indicative of incompletion.

In S610, whether the injection and ignition cut request XCUT from the M/G ECU 17 is in the ON state or not is checked. If YES, it is determined that the engine is in the un-operated state where the fuel injection and the ignition to the engine 1 are not performed by the injection controlling process and the ignition controlling process of FIGS. 6A and 6B, and the routine advances to S620.

In S620, whether the failure diagnosis completion flag XCHK is in the ON state (logical value 1) or not is checked. If the failure diagnosis completion flag XCHK is not in the ON state (if it is in the OFF state), it is determined that the failure diagnosis to the rotation sensor system has not been completed and the routine advances to S630 where the operation inhibition flag XSTOP is set in the ON state. After that, in S640, whether the engine 1 is rotating or not is checked on the basis of the engine rotating state data XKAI from the M/G ECU 17. That is, in S640, when the engine rotating state data XKAI is in the ON state, it is determined that the engine 1 is rotating. When the engine rotating state data XKAI is in the OFF state, it is determined that the engine 1 is not rotating. In the case where it is determined in S640 that the engine 1 is not rotating, the same determining process is repeated. When it is determined in S640 that the engine 1 is rotating, the routine advances to S650.

In S650, within a predetermined time (for instance, one second) since the rotating state of the engine 1 is affirmed in S640, whether a pulse signal is generated from each of the rotational angle sensor 31 and the cylinder identifying sensor 32 or not is checked. If the pulse signals are outputted from the sensors 31 and 32, it is determined that the sensors 31 and 32 are normal, and the routine advances to S660 where the operation inhibition flag XSTOP is set in the OFF state (logical value 0) to permit the fuel injection and the ignition to the engine 1 by the injection controlling process and the ignition controlling process of FIGS. 6A and 6B. On the contrary, when it is detected in S650 that the pulse signal is not outputted from one or both of the rotational angle sensor 31 and the cylinder identifying sensor 32, it is determined that the rotation sensor system has failures, and the routine immediately advances to S670 without setting the operation inhibition flag XSTOP in the OFF state. In S670, a failure displaying process such as turn-on of a malfunction warning lamp arranged in the meter panel of the vehicle or display of a message for notifying of a failure in the engine 1 on the display in the vehicle is performed. In S680, a limp-home request is transmitted to the M/G ECU 17. The limp-home request denotes a request for shifting the operating mode of the M/G ECU 17 to the limp-home mode in which the vehicle is driven only by the outputs of the M/Gs 3 and 5. After sending the limp-home request to the M/G ECU 17 in S680 or after setting the operation inhibition flag XSTOP in the OFF state in S660, the routine advances to S690 where the failure diagnosis completion flag XCHK is set in the ON state. After that, the routine is returned to S610.

On the other hand, when it is determined in S610 that the injection and ignition cut request XCUT from the M/G ECU 17 is not in the ON state (NO in S610), the routine advances to S700 where the failure diagnosis completion flag XCHK is set in the OFF state. After that, the routine is returned to S610 again. When it is determined in S620 that the failure diagnosis completion flag XCHK is in the ON state, the routine is immediately returned to S610.

By such a rotation sensor system failure detecting process of FIG. 9, the failure diagnosis to the sensors 31 and 32 in the engine 1 is carried out as follows. When the vehicle speed v is equal to or lower than 20 km/h, the injection and ignition cut request XCUT from the M/G ECU 17 to the engine ECU 19 enters the ON state. Consequently, just after start of the execution of the rotation sensor system failure detecting process of FIG. 9 by the turn-on of the ignition switch, S610 determines that the injection and ignition cut request XCUT is in the ON state (that is, the engine un-operated state where the fuel injection and the ignition to the engine 1 are not executed by the injection controlling process of FIG. 6A and the ignition controlling process of FIG. 6B) (YES in S610).

At the time when S610 is determined as YES for the first time, the failure diagnosis completion flag XCHK is already set in the OFF state by the initialization in S600, and accordingly S620 is determined as NO (namely, it is determined that the failure diagnosis to the rotation sensor system has not been completed). In S630, the operation inhibition flag XSTOP is set in the ON state. Consequently, even if the injection and ignition cut request XCUT from the M/G ECU 17 to the engine ECU 19 is changed to the OFF state, the execution of the fuel injection (S420) and the ignition (S320) to the engine 1 by the ignition controlling process of FIG. 6A and the injection controlling process of FIG. 6B is inhibited. In the present embodiment, the operation inhibition flag XSTOP is initialized to the ON state in S600. This is to prevent the fuel injection and the ignition to the engine 1 from being performed even if the injection and ignition cut request XCUT from the M/G ECU 17 is changed to the OFF state by chance during a period from the turn-on of the ignition switch to the execution of the process of S630.

After that, the accelerator pedal is pressed down by the driver, and the vehicle is started by one or both of outputs of the M/Gs 3 and 5 driven as electric motors. When the engine 1 enters the motoring state, it is determined in S640 that the engine 1 is rotating (YES in S640). In S650, the failure diagnosis to the rotation sensor system is carried out. That is, whether or not the pulse signals are generated from the sensors 31 and 32 within a predetermined time is determined. If the pulse signals are normally outputted from the sensors 31 and 32, it is determined that the rotation sensor system is normal (YES in S650). When the normal state is determined as mentioned above, the operation inhibition flag XSTOP is set in the OFF state (S660), thereby permitting the fuel injection and the ignition to the engine 1 by the processes of FIGS. 6A and 6B when the injection and ignition cut request XCUT from the M/G ECU 17 to the engine ECU 19 is set in the OFF state.

When no pulse signals are outputted from the sensors 31 and 32, it is determined that the rotation sensor system is faulty (NO in S650), and the failure display (S670) and the transmission of the limp-home request to the M/G ECU 17 (S680) are carried out. When they are determined as faulty as mentioned above, the operation inhibition flag XSTOP remains in the ON state. After that, even if the injection and ignition cut request XCUT from the M/G ECU 17 to the engine ECU 19 enters the OFF state, the fuel injection and the ignition to the engine 1 by the processes of FIGS. 6A and 6B are not performed.

When the failure diagnosis to the rotation sensor system is completed in this manner, the failure diagnosis completion flag XCHK is set in the ON state in S690. Consequently, even if S610 is determined positively (YES) next time, S620 is determined positively (that is, it is determined that the failure diagnosis has been completed), and the failure diagnosis to the rotation sensor system is not executed.

On the other hand, when the vehicle speed v exceeds 20 km/h and the injection and ignition cut request XCUT from the M/G ECU 17 to the engine ECU 19 is changed from the ON state to the OFF state, S610 is determined negatively (NO in S610) and the failure diagnosis completion flag XCHK is set in the OFF state in S700. Consequently, when the injection and ignition cut request XCUT is changed from the ON state to the OFF state, the processes of S610 and S700 are repeated. If it is determined by the previous failure diagnosis that the rotation sensor system is normal (YES in S650), the fuel injection and the ignition to the engine 1 are performed by the processes of FIGS. 6A and 6B.

After that, when the vehicle speed v becomes equal to or lower than 20 km/h and the injection and ignition cut request XCUT from the M/G ECU 17 to the engine ECU 19 is changed from the OFF state to the ON state, S610 is determined positively (YES) again and S620 is determined negatively (NO). Further, after the operation inhibition flag XSTOP is set in the ON state in S630, S640 is determined positively (YES), and the failure diagnosis to the sensors 31 and 32 is carried out by the process of S650.

Figure 9:
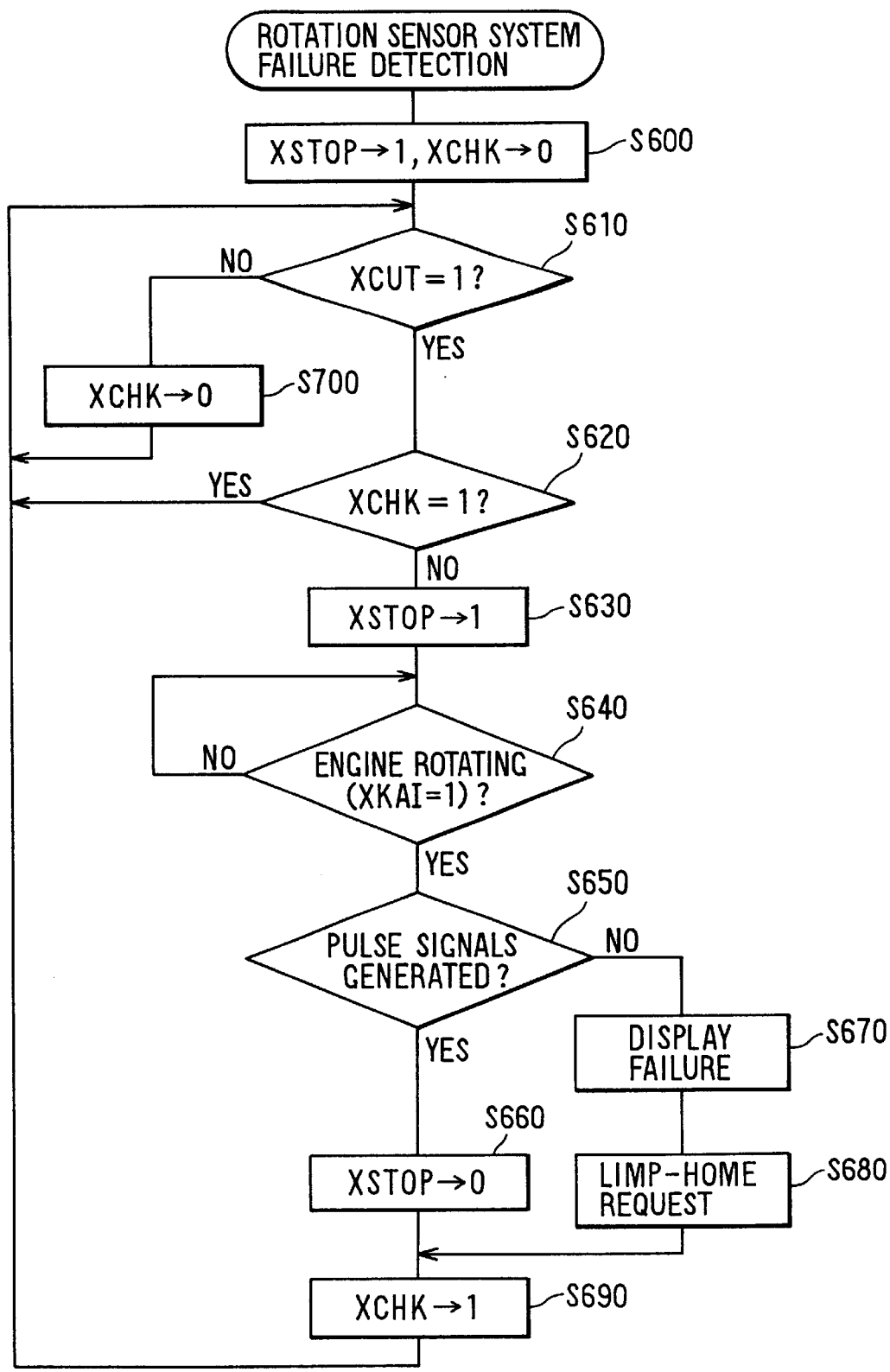
FIG. 9 is a flowchart showing a process for detecting a failure in a rotation sensor system in the hybrid vehicle system.

That is, in the rotation sensor system failure detecting process of FIG. 9, each time the engine 1 enters the motoring state (specifically, when the ignition switch is turned on and the engine 1 enters the motoring state for the first time, and each time the engine 1 is changed from the operating state where the fuel injection and the ignition are performed to the motoring state), the failure diagnosis to the rotation sensor system is carried out once.

As described above in detail, in the M/G ECU 17 and the engine ECU 19 of the present embodiment, when it is determined that the engine 1 is in the motoring state (YES in S610 and S640), whether pulse signals are normally outputted from the sensors 31 and 32 or not is checked (S650). When it is determined that the sensors 31 and 32 are faulty, the fuel injection and the ignition to the engine 1 are not performed. That is, by paying attention to the point that the engine 1 always enters the motoring state before being started, whether pulse signals are normally outputted from the rotation sensor system or not is checked in the motoring state.

According to the ECUs 17 and 19 in this embodiment, the conditions of the rotation sensor system can be checked before the fuel injection and the ignition are started to activate the engine 1. As a result, the execution of the fuel injection and the ignition to the engine 1 can be prevented if a failure in the rotation sensor system is found.

It can be therefore certainly prevented that unburned gases are released from the engine 1 in association with a failure of the rotation sensor system, and the effects on suppression of the environmental pollution of the hybrid vehicle can be enhanced. Since the fuel injection and the ignition to the engine 1 at improper timing due to a failure in the rotation sensor system are prevented, the drivability of the vehicle is not adversely affected by the failure. This is because the vehicle can be driven only by the outputs of the M/Gs 3 and 5 in a state where the fuel injection and the ignition to the engine 1 are not carried out.

Moreover, according to the second embodiment, whether the fuel injection and the ignition to the engine 1 are performed or not is checked in S610 of FIG. 9, and whether the engine 1 is rotating or not is checked in S640. If YES in both of the steps, it is determined that the engine 1 is in the motoring state. When S610 is determined positively (YES in S610), the operation inhibition flag XSTOP is set in the ON state, thereby inhibiting the execution of the fuel injection and the ignition to the engine 1 by the processes of FIGS. 6A and 6B (S630). When it is determined in S650 that the rotation sensor system is normal (YES in S650), the operation inhibition flag XSTOP is set into the OFF state again, thereby permitting the execution of the fuel injection and the ignition by the processes of FIGS. 6A and 6B (S660). If not (NO in S650), the operation inhibition flag XSTOP is left in the ON state.

Consequently, even if the injection and ignition cut request XCUT from the M/G ECU 17 to the engine ECU 19 is changed from the ON state to the OFF state in the middle of the determination of the normal/abnormal state of the rotation sensor system in S650 in FIG. 9, the fuel injection and the ignition to the engine 1 are not started. As a result, even a remote possibility that the fuel injection and the ignition to the engine 1 are carried out in spite of occurrence of a failure in the rotation sensor system can be eliminated.

More specifically, the process of S630 in FIG. 9 for setting the operation inhibition flag XSTOP into the ON state may be executed not between S620 and S640 but after it is determined that the rotation sensor system is faulty in S650 (for instance, just before S670). In this case, however, when the injection and ignition cut request XCUT from the M/G ECU 17 to the engine ECU 19 is changed from the ON state to the OFF state during determination of the normal or failure state of the rotation sensor system in S650, there is the possibility that the fuel injection and the ignition to the engine 1 are started by the processes of FIGS. 6A and 6B. In this case, if the rotation sensor system is faulty, there is a fear that, although a small amount, unburned gases are released. On the contrary, according to the second embodiment, when the engine 1 is in the motoring state, the start of the fuel injection and the ignition to the engine 1 is preliminarily inhibited, and then the normal or abnormal state of the rotation sensor system is checked in the motoring state. Consequently, the release of unburned gases can be surely prevented.

In FIG. 9, the process of S630 may be executed between S640 and S650, not between S620 and S640. In such a case, the operation inhibition flag XSTOP is set in the ON state at the time when the motoring state is determined (YES in S640), thereby inhibiting the start of the fuel injection and the ignition to the engine 1. The release of unburned gases can be, therefore, certainly prevented. However, there is an advantage if the operation inhibition flag XSTOP is set in the ON state (S630) irrespective of the rotating state of the engine 1 at the time when S610 is determined positively (YES in S610) as in FIG. 9. That is, when the engine 1 is started for the first time upon start of the vehicle, the engine 1 starts to be rotated by the outputs of the M/Gs 3 and 5 in a state where the fuel injection and the ignition to the engine 1 are not executed from the beginning. At that time, the engine 1 enters the motoring state. Upon such a start of the vehicle, the fuel injection and the injection to the engine 1 can be preliminarily inhibited before the engine 1 enters the motoring state. Therefore, the execution of the fuel injection and the ignition to the engine 1 before completion of the check of the normal/abnormal state of the rotation sensor system can be more certainly prevented. Further, the execution of the fuel injection and the ignition to the engine 1 under the failure in the rotation sensor system can be more certainly prevented.

Although the second embodiment of the present invention has been described above, it will be obviously understood that the invention is not limited to the embodiment but can be modified in various manners. For example, although whether the pulse signals are outputted or not from the sensors 31 and 32 within a predetermined time is checked in S650 in FIG. 9 in the second embodiment, it is also possible to make the M/G ECU 17 transmit data indicative of the present rotational speed of the engine 1 and check whether or not the number of pulse signals corresponding to the present rotational speed are outputted from the sensors 31 and 32 within a predetermined specific time. In such a manner, the failure diagnosis to the rotation sensor system can be more accurately carried out.

The failure diagnosis to the rotation sensor system is carried out each time the engine 1 enters the motoring state in the foregoing embodiment. In order to reduce the processing load of a microcomputer mounted on the engine ECU 19, for example, the failure diagnosis may be also performed only when the ignition switch is turned on and the engine 1 enters the motoring state for the first time. This modification can be done by simply eliminating the process of S700 in FIG. 9 (process for returning the failure diagnosis completion flag XCHK to the OFF state).

Further, it is also possible to check the normal/abnormal state of the rotation sensor system during a usual operation of the engine 1. In this case, for example, it is determined that the rotation sensor system is faulty if pulse signals are not outputted from the sensors 31 and 32 within a predetermined time during the usual operation of the engine 1.

It is also possible to purposely set the engine 1 in the motoring state and to perform the failure diagnosis to the rotation sensor system. More specifically, when the motoring request is received from the engine ECU 19, the M/G ECU 17 executes a process for immediately rotating the engine 1 by the M/Gs 3 and 5. In the case where the fuel injection and the ignition to the engine 1 are not carried out, the engine ECU 19 sends the motoring request to the M/G ECU 17 to check whether or not the pulse signals are outputted from the sensors 31 and 32 within a predetermined period of time. If no pulse signals are outputted, a failure state is determined, and the fuel injection and the ignition to the engine 1 are not performed after that. In this case, the following manner is more effective. In a manner similar to S630 to S680 in FIG. 9, the engine ECU 19 sets the operation inhibition flag XSTOP in the ON state and transmits the motoring request to the M/G ECU 17. If the engine ECU 19 determines that sensors 31 and 32 are normal, the operation inhibition flag XSTOP is returned to the OFF state.

Although the invention is applied to the parallel-series hybrid vehicle in the second embodiment, the invention can be similarly applied to other hybrid vehicles in which the engine 1 is started in the motoring state.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A control system for a hybrid vehicle, the hybrid vehicle being driven by either an electric motor or an internal combustion engine, or by combined power of the electric motor and the internal combustion engine according to driving conditions of the hybrid vehicle, the internal combustion engine being initially rotated by the electric motor in a motoring state where no fuel is supplied and no ignition is performed, and then the internal combustion engine being operated by supplying fuel and performing ignition during the motoring state, the control system comprising:

a rotation sensor system for generating pulse signals in synchronism with rotation of the engine;

an ignition system for igniting fuel supplied to the engine according to the pulse signals of the rotation sensor system;

a fuel injection system for supplying fuel to the engine according to the pulse signals of the rotation sensor system;

means for detecting the motoring state of the engine;

means for detecting a failure in either the ignition system or the rotation sensor system, or both, during the motoring state; and means for inhibiting fuel supply and ignition when the failure is detected by the failure detecting means.

2. The control system for a hybrid vehicle as in claim 1, wherein:

the ignition system receives an ignition instruction signal during the motoring state and generates a signal indicating an abnormal operation of the ignition system when the ignition system does not function normally; and thereby the failure detecting means detects the failure in the ignition system.

3. The control system for a hybrid vehicle as in claim 1, wherein:

the failure detecting means determines whether the rotation sensor system generates predetermined pulse signals during the motoring state of the engine in sychronism with rotation of the engine; and thereby the failure detecting means detects the failure in the rotation sensor system.

4. The control system for a hybrid vehicle as in claim 1, wherein:

the motoring state detecting means determines that the engine is in the motoring state, if the ignition system and fuel injection system are not in operation and the engine is rotated by the electric motor.

5. The control system for a hybrid vehicle as in claim 1, wherein:

operation of the ignition system and the fuel injection system is temporarily inhibited when the motoring state detecting means determines that the engine is in the motoring state; and the ignition system and the fuel injection system are allowed to operate after and when the failure detecting means has detected no failure in the ignition system and the rotation sensor system.

6. A control system for a hybrid vehicle, the hybrid vehicle being driven by either an electric motor or an internal combustion engine, or by combined power of the electric motor and the internal combustion engine according to driving conditions of the hybrid vehicle, the internal combustion engine being initially rotated by the electric motor in a motoring state where no fuel is supplied and no ignition is performed, and then the internal combustion engine being operated by supplying fuel and performing ignition during the motoring state, the control system comprising:

a rotation sensor system for generating at least one signal in synchronism with rotation of the engine;

an ignition system for igniting fuel supplied to the engine according to the at least one signal of the rotation sensor system;

a fuel injection system for supplying fuel to the engine according to the at least one signal of the rotation sensor system;

motoring state detector for detecting the motoring state of the engine;

failure detector for detecting a failure in either the ignition system or the rotation sensor system, or both, during the motoring state; and fuel supply and ignition inhibitor for inhibiting the fuel supply and ignition when the failure is detected by the failure detector.

7. The control system for a hybrid vehicle as in claim 6, wherein:

the failure detector determines whether the rotation sensor system generates at least one signal during the motoring state of the engine in sychronism with rotation of the engine; and thereby the failure detector detects the failure in the rotation sensor system.

8. The control system for a hybrid vehicle as in claim 6, wherein:

the motoring state detector determines that the engine is in the motoring state, if the ignition system and fuel injection system are not in operation and the engine is rotated by the electric motor.

9. The control system for a hybrid vehicle as in claim 6, wherein:

operation of the ignition system and the fuel injection system is temporarily inhibited when the motoring state detector determines that the engine is in the motoring state; and the ignition system and the fuel injection system are allowed to operate after and when the failure detector has detected no failure in the ignition system and the rotation sensor system.

10. A method of detecting a failure in an rotation sensor system of a control system for a hybrid vehicle which is driven by either an electric motor or an internal combustion engine, or by combined power of the electric motor and the internal combustion engine according to driving conditions of the hybrid vehicle, the method comprising steps of:

rotating the internal combustion engine by the electric motor without supplying fuel to the engine;

determining whether the rotation sensor system outputs predetermined pulse signals in synchronism with rotation of the engine; and inhibiting fuel supply to the engine if the rotation sensor system does not output the predetermined pulse signals, or permitting fuel supply to the engine to start the engine if the rotation sensor system outputs the predetermined pulse signals.

* * * * *

UNITED STATES PATENT AND TRADEMARK OFFICE
CERTIFICATE OF CORRECTION

PATENT NO.     : 6,276,472 B1
DATED          : August 21, 2001
INVENTOR(S)    : Takashima et al.

It is certified that error appears in the above-identified patent and that said Letters Patent is hereby corrected as shown below:

Title page,
Inventors, change co-inventor's name "Shoji Tzumi" to -- Shoji Izumi --.

Signed and Sealed this

Ninth Day of April, 2002

Attest:

Attesting Officer

JAMES E. ROGAN
*Director of the United States Patent and Trademark Office*